United States Patent
Rule et al.

(10) Patent No.: US 9,694,538 B2
(45) Date of Patent: Jul. 4, 2017

(54) ARTICLES HAVING A MULTILAYER STRUCTURE INCLUDING UNDERCUT FEATURES INTERLOCKED WITH AN ADHESIVE, AND METHODS OF MAKING SAME

(71) Applicant: 3M INNOVATIVE PROPERTIES COMPANY, St. Paul, MN (US)

(72) Inventors: Joseph D. Rule, Woodbury, MN (US); Mario A. Perez, Burnsville, MN (US); Kevin M. Lewandowski, Inver Grove Heights, MN (US); Robert A. Follensbee, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/915,675

(22) PCT Filed: Sep. 3, 2014

(86) PCT No.: PCT/US2014/053831
§ 371 (c)(1),
(2) Date: Mar. 1, 2016

(87) PCT Pub. No.: WO2015/041844
PCT Pub. Date: Mar. 26, 2015

(65) Prior Publication Data
US 2016/0221256 A1 Aug. 4, 2016

Related U.S. Application Data

(60) Provisional application No. 61/879,295, filed on Sep. 18, 2013.

(51) Int. Cl.
*B29C 65/00* (2006.01)
*B29C 65/48* (2006.01)
(Continued)

(52) U.S. Cl.
CPC .... *B29C 66/30321* (2013.01); *B29C 37/0014* (2013.01); *B29C 37/0078* (2013.01);
(Continued)

(58) Field of Classification Search
None
See application file for complete search history.

(56) References Cited

U.S. PATENT DOCUMENTS 4,054,701 A 10/1977 Hahn
4,134,199 A 1/1979 Liguori
(Continued)

FOREIGN PATENT DOCUMENTS

CN 103124777 5/2013
JP S 55-071557 5/1980
(Continued)

OTHER PUBLICATIONS

"Master Bond MB Series Cyanoacrylates", Technical Data Sheet, 4 pages.
(Continued)

*Primary Examiner* — David Sample
*Assistant Examiner* — Donald M Flores, Jr.
(74) *Attorney, Agent, or Firm* — Adrian L. Pishko

(57) ABSTRACT

Articles are provided, having a multilayer structure including (a) a first layer formed from polyolefin and including undercut features formed on and extending from an integral backing; (b) a second layer including an adhesive having a Shore D hardness of greater than 59 when cured; and (c) a third layer including a substrate. The second layer is interlocked with the undercut features, the third layer is adhered to the adhesive, and the second layer is disposed between the first layer and the third layer. A method is also provided including (a) depositing a polyolefin resin into a mold cavity to form a first layer including undercut features; (b) demold-
(Continued)

ing the first layer from the mold cavity at a rate of at least 150 millimeters per minute; (c) applying a curable adhesive to the undercut features to form a second layer attached to the first layer; and (d) attaching a third layer including a substrate to the second layer.

19 Claims, 3 Drawing Sheets

(51) Int. Cl.
    *B32B 27/32*   (2006.01)
    *B32B 7/12*    (2006.01)
    *B32B 37/12*   (2006.01)
    *B29C 37/00*   (2006.01)
    *B32B 3/30*    (2006.01)
    *B32B 9/04*    (2006.01)
    *B32B 15/085*  (2006.01)
    *B32B 21/08*   (2006.01)
    *B32B 25/08*   (2006.01)
    *B32B 27/06*   (2006.01)
    *B32B 27/08*   (2006.01)
    *B32B 27/10*   (2006.01)
    *B32B 27/12*   (2006.01)
    *B29K 23/00*   (2006.01)
    *B29L 9/00*    (2006.01)

(52) U.S. Cl.
    CPC ........... B29C 65/483 (2013.01); B29C 66/02 (2013.01); B32B 3/30 (2013.01); B32B 7/12 (2013.01); B32B 9/045 (2013.01); B32B 15/085 (2013.01); B32B 21/08 (2013.01); B32B 25/08 (2013.01); B32B 27/065 (2013.01); B32B 27/08 (2013.01); B32B 27/10 (2013.01); B32B 27/12 (2013.01); B32B 27/32 (2013.01); B32B 37/12 (2013.01); *B29K 2023/06* (2013.01); *B29K 2023/12* (2013.01); *B29L 2009/00* (2013.01); *B32B 2305/07* (2013.01)

(56) References Cited

U.S. PATENT DOCUMENTS

| | | | |
|---|---|---|---|
| 4,822,270 A | 4/1989 | Bonissone | |
| 4,872,243 A | 10/1989 | Fischer | |
| 5,077,870 A * | 1/1992 | Melbye | A44B 18/0049 24/452 |
| 5,234,130 A | 8/1993 | Benioff | |
| 5,554,333 A | 9/1996 | Fujiki | |
| 5,656,226 A | 8/1997 | McVicker | |
| 5,679,302 A * | 10/1997 | Miller | A44B 18/0049 264/167 |
| 5,792,411 A * | 8/1998 | Morris | A44B 18/0049 219/121.69 |
| 5,879,604 A | 3/1999 | Melbye | |
| 6,162,040 A | 12/2000 | Clune | |
| 6,163,939 A | 12/2000 | Lacey | |
| 6,187,247 B1 | 2/2001 | Buzzell | |
| RE37,338 E | 8/2001 | McVicker | |
| 6,287,665 B1 | 9/2001 | Hammer | |
| 6,627,133 B1 | 9/2003 | Tuma | |
| 7,029,265 B2 | 4/2006 | Plammer | |
| 7,198,743 B2 | 4/2007 | Tuma | |
| 2005/0276985 A1 * | 12/2005 | Muggli | B32B 3/26 428/421 |
| 2005/0281995 A1 | 12/2005 | Murai | |
| 2008/0229556 A1 | 9/2008 | Hammer | |
| 2012/0040129 A1 | 2/2012 | Tseng et al. | |
| 2013/0186566 A1 * | 7/2013 | Lotz | C09J 123/142 428/200 |

FOREIGN PATENT DOCUMENTS

| | | |
|---|---|---|
| JP | S 63-178041 | 1/1987 |
| JP | H 01-146725 | 6/1989 |
| JP | 2003-80603 | 3/2003 |
| KR | 10-2001-0101487 | 11/2001 |
| KR | 10-2007-0116978 | 12/2007 |
| KR | 10-2011-0122847 | 11/2011 |
| WO | WO 00/41479 | 7/2000 |
| WO | WO 2006-001897 | 1/2006 |
| WO | WO 2006/099000 | 9/2006 |
| WO | WO 2010/096310 | 8/2010 |

OTHER PUBLICATIONS

3M, "Scotch-Weld Epoxy Adhesives", Dec. 2009, 8 pages.
Pocius, "Adhesion and Adhesives Technology," 183 (1997).
Pocius, "Adhesion and Adhesives Technology: An Introduction", 185-188 (1997).
Pocius, "Adhesion and Adhesives Technology", 140-145 (2002).
Qi, "Durometer Hardness and the Stress-Strain Behavior of Elastomeric Materials", Rubber Chemistry and Technology, 2002, vol. 76, pp. 419-435.
Tripodo, "Highly Flexible Poly (ethyl-2-cyanoacrylate) Based Materials Obtained by Incorporation of Oligo(ethylene glycol)diglycidylether", Macromol. Symp., 2011, vol. 309/310, pp. 49-58.
International Search Report for PCT International Application No. PCT/2014/053831 mailed on Feb. 23, 2015, 3 pages.

* cited by examiner

ARTICLES HAVING A MULTILAYER STRUCTURE INCLUDING UNDERCUT FEATURES INTERLOCKED WITH AN ADHESIVE, AND METHODS OF MAKING SAME

CROSS REFERENCE TO RELATED APPLICATIONS

This application is a national stage filing under 35 U.S.C. 371 of PCT/US2014/053831, filed Sep. 3, 2014, which claims priority to U.S. Application No. 61/879,295, filed Sep. 18, 2013, the disclosure of which is incorporated by reference in its/their entirety herein.

FIELD

Articles having a multilayer structure including undercut features interlocked with an adhesive, and methods of making such articles are provided.

BACKGROUND

When molding polymers, the molds or tools are typically designed to allow the polymer to be demolded without being deformed. By including a draft angle in mold cavities (i.e. a taper such that the molded part is widest at the cavity opening and becomes increasingly narrow toward the deepest part of the cavity), demolding without deformation is facilitated.

In some cases, features are molded to have a shape in which a protuberance or indentation impedes withdrawal of the molded feature from the mold, and these are referred to as undercut features. Undercut features include, for instance, hook shapes because the hooks bend to the side such that the tips of the hooks are suspended to the side of the base of the hooks. Undercut features also include capped stems (e.g., stems with heads, having a nail or mushroom shape) because the caps project beyond the diameter of the base on which they rest. Undercut features further include funnel-shaped features in which the diameter of the feature gradually increases from the base to the tip. Undercut features are generally difficult to demold because the overhanging portion of the feature cannot be usually pulled from the mold cavity without breaking or permanently deforming the feature.

Multiple techniques have been developed to overcome the complications of demolding undercut features. In some cases, the mold is made of multiple parts that can be partially disassembled after molding, thus opening each of the cavities and allowing the feature to be easily removed. Such an approach can be effective; however, it typically requires complicated tooling. Alternatively, capped stems can be produced by first molding straight stems with no undercut, and then capping those stems in a separate shaping step after demolding. Yet another general approach involves allowing undercut features to bend during demolding, and then using the resilience of the polymer to bring it back to the as-molded shape, for example using hook shapes. Hook shapes formed by such methods include either a constant or decreasing cross-sectional area moving from the base of the hook to the tip of the hook. The shape of a hook allows the hook to be demolded by bending and/or maneuvering the hook to come out of the cavity, so shear strains and compressive strains are minimized. One disadvantage to employing a hook shape as an undercut feature is that a hook usually bends or breaks under a lower force than other undercut features, such as capped stems or funnels.

SUMMARY

Articles are provided having a layer including undercut features interlocked with an adhesive. In a first aspect, an article is provided that includes a multilayer structure. The multilayer structure includes (a) a first layer including a plurality of undercut features formed on and extending from an integral backing, wherein the first layer is formed of a polyolefin; (b) a second layer comprising an adhesive having a Shore D hardness of greater than 59 when cured, wherein the second layer is interlocked with the plurality of undercut features; and (c) a third layer including a substrate. The third layer is adhered to the adhesive and the second layer is disposed between the first layer and the third layer.

In a second aspect, a method of making an article including a multilayer structure is provided. The method includes (a) depositing a polyolefin resin into a mold cavity to form a first layer including a plurality of undercut features on and extending from an integral backing; (b) demolding the first layer from the mold cavity at a rate of at least 150 millimeters per minute (mm/min); (c) applying a curable adhesive to the plurality of undercut features to form a second layer attached to the first layer, the curable adhesive having a Shore D hardness of greater than 59 when cured; and (d) attaching a third layer comprising a substrate to the second layer. The second layer is disposed between the first layer and the third layer.

Figure 1A:
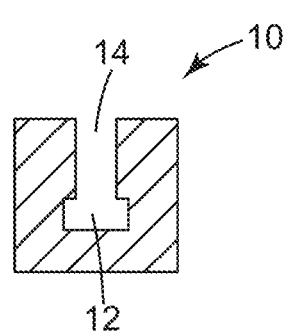
FIG. 1A is a partial cross-sectional view of a mold tool.
Figure 1B:
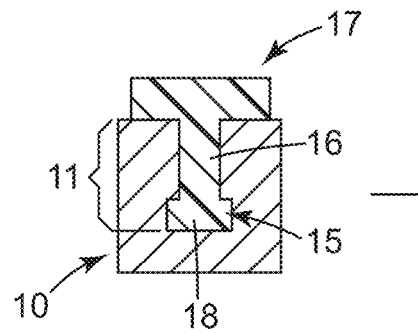
FIG. 1B is a partial cross-sectional view of the mold tool of FIG. 1A filled with a polyolefin.

While the above-identified drawings, which may not be drawn to scale, set forth various embodiments of the present disclosure, other embodiments are also contemplated, as noted in the Detailed Description.

DETAILED DESCRIPTION

Methods and articles are provided having a layer including undercut features interlocked with an adhesive. More specifically, the article includes a multilayer structure comprising a first layer, a second layer, and a third layer. The first layer is formed of a polyolefin and comprises a plurality of undercut features. The second layer comprises an adhesive that is interlocked with the plurality of undercut features. The third layer comprises a substrate and is adhered to the adhesive. Accordingly, the second layer is disposed between the first layer and the third layer.

A method of making an article including a multilayer structure is also provided. The method includes depositing a polyolefin resin into a mold cavity to form a first layer including a plurality of undercut features on and extending from an integral backing, and demolding the first layer from the mold cavity at a rate of at least 150 millimeters per minute (mm/min). Next, a curable adhesive is applied to the plurality of undercut features to form a second layer attached to the first layer, wherein the curable adhesive has a Shore D hardness of greater than 59 when cured. Further, a third layer comprising a substrate is attached to the second layer. The second layer is disposed between the first layer and the third layer.

The recitation of any numerical range by endpoints is meant to include the endpoints of the range, all numbers within the range, and any narrower range within the stated range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about."

Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example, the expression "A and/or B" means A, B, or a combination of A and B.

The term "undercut" refers to a protuberance or indentation that impedes withdrawal of a molded feature from a mold cavity.

The term "undercut feature" refers to an element that includes a protuberance or indentation that impedes withdrawal of the element from a mold cavity. In some cases, a portion of an element is undercut (e.g., the head portion of a nail shape) while in other cases the entire element is undercut (e.g., a funnel shape).

The term "stem" refers to the main axis of an undercut feature integrally formed on and extending from a backing.

The term "head" refers to an optional portion of an undercut feature located on an end of a stem.

The term "backdrafted" refers to a type of undercut feature, i.e., an undercut feature integrally formed on and extending from a backing, in which the cross-sectional area gradually increases from proximal to the backing to distal to the backing.

The term "interlock" refers to macroscopic penetration of one or more undercut features into another material (e.g., an adhesive), or entanglement of one or more undercut features with another material. An interlock provides a mechanical interaction of an element having one or more undercut features with another material. The greater the extent of mechanical interaction, the larger the amount of force required to pull apart the interlocked materials.

The term "proximal" refers to being located close to the point of origin (e.g., a backing layer), whereas the term "distal" refers to being located far from the point of origin.

In a first aspect, an article is provided. More particularly, an article is provided comprising a multilayer structure comprising (a) a first layer comprising a plurality of undercut features formed on and extending from an integral backing, wherein the first layer is formed of a polyolefin; (b) a second layer comprising an adhesive having a Shore D hardness of greater than 59 when cured, wherein the second layer is interlocked with the plurality of undercut features; and (c) a third layer including a substrate, wherein the third layer is adhered to the adhesive and the second layer is disposed between the first layer and the third layer.

In a second aspect, a method is provided. More specifically, the method comprises (a) depositing a polyolefin resin into a mold cavity to form a first layer comprising a plurality of undercut features on and extending from an integral backing; (b) demolding the first layer from the mold cavity at a rate of at least 150 millimeters per minute (mm/min); (c) applying a curable adhesive to the plurality of undercut features to form a second layer attached to the first layer, the curable adhesive having a Shore D hardness of greater than 59 when cured; and (d) attaching a third layer comprising a substrate to the second layer, wherein the second layer is disposed between the first layer and the third layer.

The following description of embodiments of the present disclosure relates to either one or both of the above aspects.

Bonding low surface energy (LSE) polymers to other materials has been a challenge, and in many cases, strong structural bonds to LSE polymers (e.g., polypropylene and polyethylene) require specially designed adhesives. The term "low surface energy" as used herein refers to a material having a major surface comprising a surface energy of less than 33 milliNewtons per meter (mN/m). Such adhesives are in contrast to common, less expensive adhesives (e.g., epoxy), which typically generate relatively weak bonds to LSE polymers. Embodiments provided herein enable the use of many different adhesives to bond low surface energy polymers to other materials (e.g., substrates). In most embodiments, the first layer formed of a polyolefin is a LSE polymer. When the second layer comprising an adhesive is cured, undercut features formed on and extending from an integral backing are embedded in the solidified adhesive and interlock with the adhesive. At this point, the undercut features cannot be separated from the adhesive without significant deformation. Such a mechanical interlock creates a strong bond between the polymer and the adhesive regardless of the interfacial adhesion between the polymer and adhesive, as long as the temperature remains below the softening point of the polymer.

As mentioned above, undercut features can be difficult to demold relative to non-undercut features because the deformations of the features involve significant compressive and/or shear strains. To accommodate these more severe strains, it has been discovered that relatively precise, elevated temperature must be maintained. Moreover, at these elevated temperatures, the demolding must be done at a fast rate to maintain the elastic nature of the deformations.

FIG. 1 provides partial cross-sectional exemplary views illustrating steps to form a layer having undercut features according to aspects of the disclosure. FIG. 1A shows a cross-sectional view of a portion of a mold tool 10, which has been formed to have a plurality of cavities, of which only a single cavity 14 is shown. Cavity 14 ends in an area 12 formed to provide an undercut feature on the final molded layer. In use, the mold tool 10 is filled with a polyolefin resin 15, as shown in FIG. 1B, to form the layer 17. The polyolefin 15 is filled into the mold tool 10. As shown in FIG. 1B, layer 17 comprises a backing 19 and a stem 16 integrally formed on and extending from the backing 19. Stem 16 comprises a head 18 disposed on the stem 16 distal from the backing 19. In the embodiment of FIG. 1, the stem 16 and the head 18 together provide an undercut feature 11.

Figure 1C:
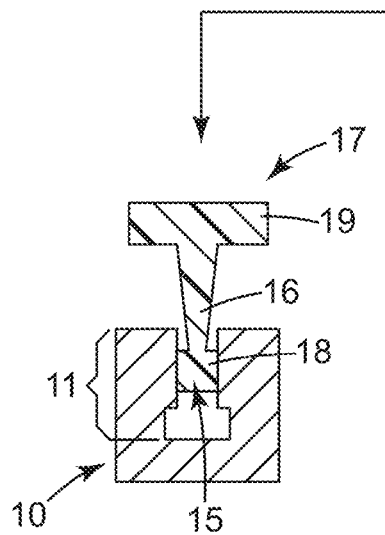
FIG. 1C is a partial cross-sectional view of the mold tool of FIG. 1B from which the polyolefin is being demolded.
Figure 1D:
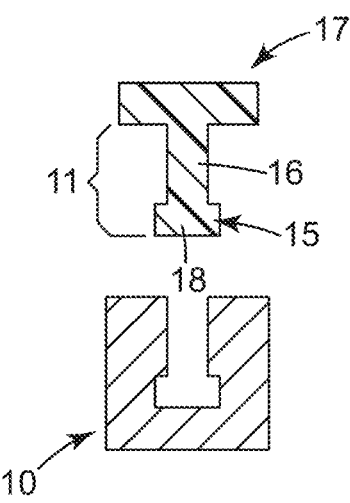
FIG. 1D is a partial cross-sectional view of the mold tool of FIG. 1C from which the polyolefin has been demolded.

FIG. 1C illustrates demolding the layer 17. In particular, the temperature of the mold tool 10 is controlled such that the polyolefin 15 has a temperature within a range at which it is rubbery. Typically, the mold tool is maintained at a temperature between room temperature (e.g., about 23-25° C.) and below the melting temperature ($T_m$) of the polyolefin 15. The temperature of the polyolefin 15 is important because if the temperature is too low, the undercut feature 11 may become permanently deformed or broken when demolded from the cavity 14. If the temperature is too high, the undercut feature 11 will not have enough elastic memory to regain its prior molded shape and/or the polyolefin 15 will have insufficient mechanical strength to withstand the demolding force, which could result in failure of the backing 19 of the layer 17. As illustrated in FIG. 1C, having a suitable temperature range for the polyolefin 15 allows the undercut feature 11 to become temporarily deformed during its removal from the cavity 14. This is followed by the return of the undercut feature 11 to its molded shape prior to demolding, as shown in FIG. 1D. In particular, the demolded layer 17 is shown in FIG. 1D to have the same dimensions as when it was in the mold tool 10, in particular the undercut feature 11 is not deformed or broken. In addition to the temperature of the polyolefin 15, the rate of demolding of the layer 17 should be above a minimum rate, such as 150 millimeters per minute (mm/min), to demold the layer 17 with the fewest (preferably none) deformed or broken undercut features 11.

The polyolefin resin is typically deposited into a mold cavity via conventional molding methods, including for example and without limitation roll molding, injection molding, extrusion molding, vacuum molding, or a combination thereof. In certain embodiments, the method comprises heating the polyolefin resin prior to depositing the resin into the mold cavity, preferably to a temperature above the melting temperature ($T_m$) of the polyolefin resin. In such embodiments, the method typically also comprises cooling the polyolefin resin in the mold cavity by maintaining the temperature of the mold cavity at a temperature between 25° C. and below the $T_m$ of the polyolefin resin, prior to demolding the first layer from the mold cavity. In other embodiments, the method comprises depositing the resin into the mold cavity as a solid and allowing the resin to conform to the mold cavity shape prior to demolding the first layer from the mold cavity. In such embodiments, the method typically comprises heating the polyolefin resin in the mold cavity by maintaining the temperature of the mold cavity at a temperature between 25° C. and below the degradation temperature ($T_d$) of the polyolefin, preferably between 25° C. and the $T_m$ of the polyolefin resin, during molding of the first layer in the mold cavity. The higher the temperature of the mold cavity is raised above the $T_m$ of the polyolefin, the more the temperature of the mold cavity will need to be decreased prior to demolding.

It was discovered that the temperature at which the demolding is performed affects the ability to demold the undercut features with minimal deformation and/or breakage of the undercut features. Preferably, the temperature of the mold cavity is maintained at a temperature between the $T_m$ of the polyolefin resin and 30° C. below the $T_m$ of the polyolefin resin when the demolding is performed. In certain embodiments the temperature of the mold cavity is maintained at between 50° C. and 200° C., or between 75° C. and 150° C., or between 100° C. and 150° C., or between 125° C. and 175° C., or between 150° C. and 175° C. More specifically, in certain embodiments the polyolefin is polypropylene and the temperature of the mold cavity is maintained at between 130° C. and 170° C. or between 145° C. and 150° C., while in other embodiments the polyolefin is high density polyolefin (HDPE) and the temperature of the mold cavity is maintained between 110° C. and 135° C. or between 115° C. and 125° C. In certain embodiments, the temperature of the mold cavity is adjusted by subjecting one major surface of the mold tool to elevated temperature. In another embodiment, the temperature of the mold cavity is adjusted by placing the mold in an oven. Other various methods of adjusting the temperature of the mold cavity can be determined by a skilled practitioner.

It was discovered that the rate at which the demolding is performed also affects the ability to demold the undercut features with minimal deformation and/or breakage of the undercut features. Preferably, the first layer is demolded from the mold cavity at a rate of at least 150 millimeters per minute (mm/min), or at least 200 mm/min, or at least 250 mm/min, or at least 300 mm/min, or at least 350 mm/min, or at least 400 mm/min, or at least 450 mm/min, or at least 500 mm/min. In certain embodiments the method includes demolding the first layer from the mold cavity at a rate between 150 mm/min and 550 mm/min, or between 150 mm/min and 300 mm/min, or between 350 mm/min and 550 mm/min, or between 250 mm/min and 500 mm/min.

In many embodiments, the method further comprises curing the curable adhesive after attaching the third layer to the second layer. The second layer is attached to the first layer primarily via interlocking of the adhesive with the plurality of undercut features. As used herein, the term "interlock" refers to macroscopic penetration of one or more undercut features into another material (e.g., an adhesive), or entanglement of one or more undercut features with another material. An interlock provides a mechanical interaction of an element having one or more undercut features with another material and although the adhesive of the second layer may enhance the connection between the first and second layers, an interlock does not rely upon the adhesive properties of the second layer to maintain connection between the first layer and the second layer.

Figure 2:
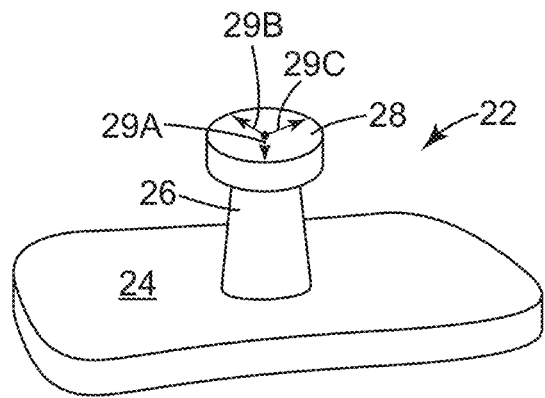
FIG. 2 is a partial perspective view of an undercut feature having a stem and a head, extending from an integral backing.

In most embodiments, each of the plurality of undercut features comprises a stem extending from the integral backing, which is the main axis of each of the undercut features. FIG. 2 provides an exemplary partial perspective view of an undercut feature 22 (having a generally nail-like shape) extending from an integral backing 24. The feature comprises a stem 26 extending from the backing 24. Optionally, one or more undercut features comprise a backdrafted shape, for instance a funnel shape.

Figure 3:
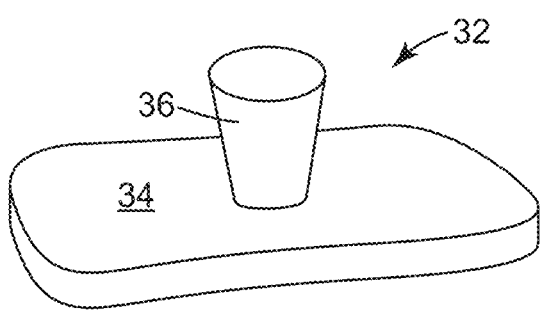
FIG. 3 is a partial perspective view of an undercut feature having a funnel shape, extending from an integral backing.

FIG. 3 provides an exemplary partial perspective view of an undercut feature 32 comprising a funnel shape extending from an integral backing 34. The feature comprises a stem 36 extending from the backing 34. Stems of the plurality of undercut features preferably all extend from the integral backing at the same angle. In an embodiment, the stem of each of the plurality of undercut features comprises a shape comprising an increase in cross-sectional area from proximate to the integral backing to distal to the integral backing. One example of such a shape is funnel shape shown in FIG. 3. The stem of each of the plurality of undercut features often comprises a single axis comprising one or more circular cross-sections. Each of FIGS. 2 and 3 shows an undercut feature having a stem comprising a single axis with more than one circular cross-section; in particular, the cross-section of the stem 26 in FIG. 2 decreases from proximal to the integral backing 24 to distal to the backing 24, and the cross-section of the stem 36 in FIG. 3 increases from proximal to the integral backing 34 to distal to the backing 34.

Figure 8:
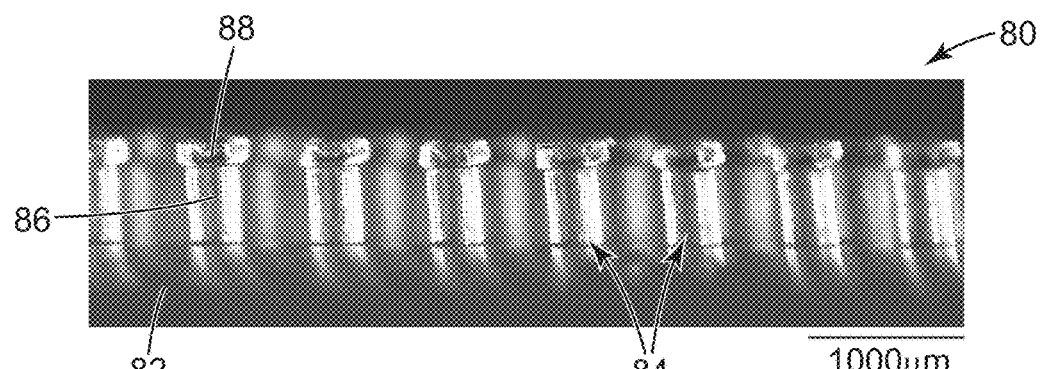
FIG. 8 is an optical microscope image of a cross-section of a first layer comprising an array of undercut features having a nail shape.

In certain embodiments, each of the plurality of undercut features comprises a head formed on the stem, the head located distal to the integral backing. The head of each of the plurality of undercut features preferably comprises a cross-sectional area greater than a cross-sectional area of the stem, with each head extending radially from the stem in at least three directions. The head of each of the plurality of undercut features comprises one or more circular cross-sections. Referring back to FIG. 2, the undercut feature 22 comprises a head 28 formed on the stem 26 and located distal to the integral backing 24, in which the head 28 comprises a circular cross-sectional area greater than a cross-sectional area of the stem 26, with each head 28 extending radially from the stem in at least three directions, as indicated by 29A, 29B, and 29C. The plurality of undercut features including a head often comprises a nail shape, a mushroom shape, or a combination thereof. For instance, referring to FIG. 8, an optical microscope image is provided of a cross-section of a first layer 80 formed of polypropylene comprising a backing 82 and an array of undercut features 84 each having a nail shape, with each of the undercut features 84 each comprising a stem 86 and a head disposed on the stem 88, prepared according to an embodiment of the present disclosure.

In certain embodiments, the head of each of the plurality of undercut features extends from the stem a distance between 0.005 in (0.127 mm) and 0.1 in (2.54 mm), or between 0.02 in (0.508 mm) and 0.1 in (2.54 mm), or between 0.005 in (0.127 mm) and 0.05 in (1.27 mm), or between 0.01 in (0.254 mm) and 0.05 in (1.27 mm) A longer extension of the head from the stem provides the potential for increased interlocking as well as a concomitantly increased likelihood of deformation and/or breakage of the head during demolding of the undercut features.

The demolding process occasionally results in the deformation and/or breakage of one or more individual undercut features formed integrally on the backing. Deformed and/or broken undercut features thus do not have the same geometry as the undercut features that were demolded without being deformed and/or broken. The term "same geometry" as used herein refers to structures having substantially identical shapes, in which differences or dissimilarities are sufficiently insignificant as to have no effect on the extent of interlock between the undercut features and an adhesive. For example, minor differences in the plurality of mold cavities of a tool due to the process employed to form the tooling (such as small variations of the positioning of a head portion on a stem portion), resulting in undercut features having minute structural variations are encompassed within the term "same geometry" despite not having absolutely identical geometry. Similarly, some permanent deformations during demolding (e.g., development of some concavity of the originally flat tops of the heads of undercut features, or production of roughened edges at the distal ends of the undercut features) do not affect the extent of interlock between the undercut features and an adhesive. In contrast, portions of stems and/or heads that are completely broken off or bent such that the undercut features no longer have an undercut characteristic are not encompassed by the term "same geometry".

The fewer the undercut features that are deformed, broken, or both, the stronger the bond will be between the first layer and the second layer. Typically, 50% to 100% of the undercut features comprise the same geometry, or 60% to 100%, or 70% to 100%, or 80% to 100%, or 90% to 100%, or 60% to 90%, or 70% to 90%, or 80% to 90% of the undercut features comprise the same geometry. Alternatively, 1% to 49% of the undercut features comprise different geometries from each other.

Figure 5A:
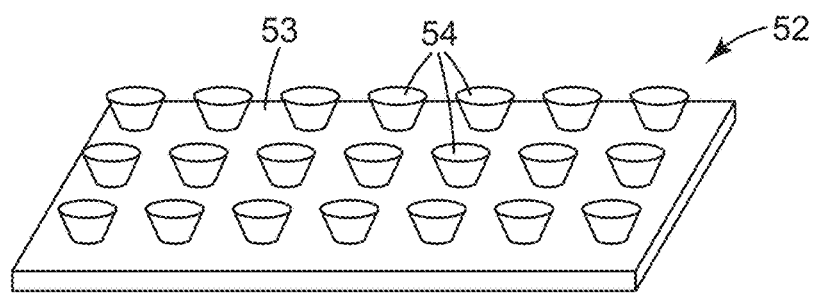
FIG. 5A is a partial perspective view of a first layer comprising a backing and a plurality of undercut features each having a funnel shape, extending from the backing.
Figure 5B:
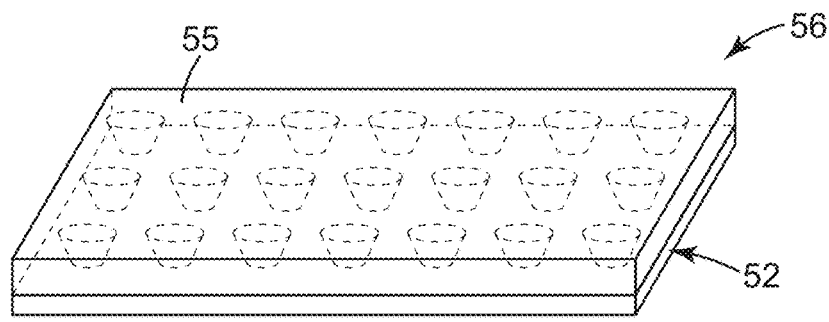
FIG. 5B is a partial perspective view of a multilayer structure including the first layer of FIG. 5A further including a second layer.
Figure 5C:
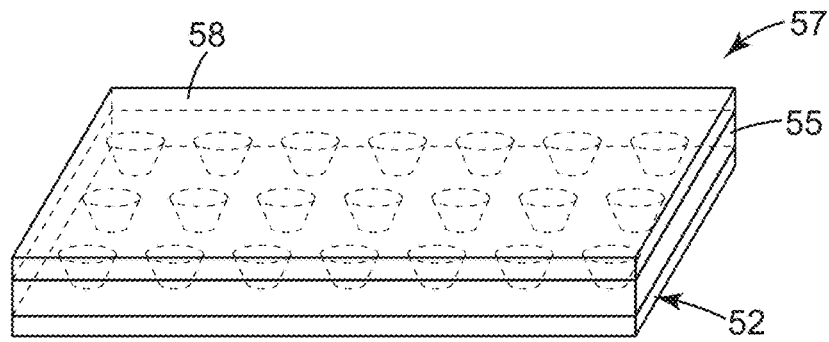
FIG. 5C is a partial perspective view of an article comprising the multilayer structure of FIG. 5B further including a third layer.

FIG. 5 provides partial perspective exemplary views illustrating steps to form an article comprising a multilayer structure according to aspects of the disclosure. FIG. 5A provides a partial perspective view of a first layer 52 formed of a polyolefin, comprising a backing 53 and a plurality of undercut features 54 integrally formed on and extending from the backing 53. The undercut features 54 each comprise a backdrafted shape, namely a funnel shape. FIG. 5B provides a partial perspective view of a two-layer multilayer structure 56 including the first layer 52 and a second layer 55. The second layer 55 is a curable adhesive applied to the plurality of undercut features 54 to form the second layer 55 attached to the first layer 52. In many embodiments, the adhesive contacts the surfaces of the plurality of undercut features 54 and at least a portion of the surface of the backing 53. FIG. 5C provides a partial perspective view of an article 57 comprising a three-layer multilayer structure including the first layer 52, a third layer 58, and the second layer 55 disposed between the first layer 52 and the third layer 58. The third layer 58 is a substrate that is preferably not a low surface energy material.

In many embodiments, the method further comprises curing the adhesive after attaching the third layer to the second layer. The second layer is attached to the first layer primarily via interlocking of the adhesive with the plurality of undercut features. As used herein, the term "interlock" refers to macroscopic penetration of one or more undercut features into another material (e.g., an adhesive), or entanglement of one or more undercut features with another material. An interlock provides a mechanical interaction of an element having one or more undercut features with another material and although the adhesive of the second layer may enhance the connection between the first and second layers, an interlock does not rely upon the adhesive properties of the second layer to maintain connection between the first layer and the second layer. In most embodiments, the adhesive buries the undercut features, which allows for a larger surface area of adhesive to contact a substrate.

The article 57 may be used and/or tested for its mechanical properties after optionally curing the adhesive. Such an article 57 provides a practical way to attach the low surface energy material (i.e., the polyolefin) of the first layer 52 to the substrate of the third layer 58. More specifically, the adhesive of the second layer 55 is bonded to the first layer 52 using mechanical interlocking of the undercut features 54 with the cured adhesive, while the adhesive of the second layer 55 is bonded to the third layer 58 using conventional adhesion.

Figure 6:
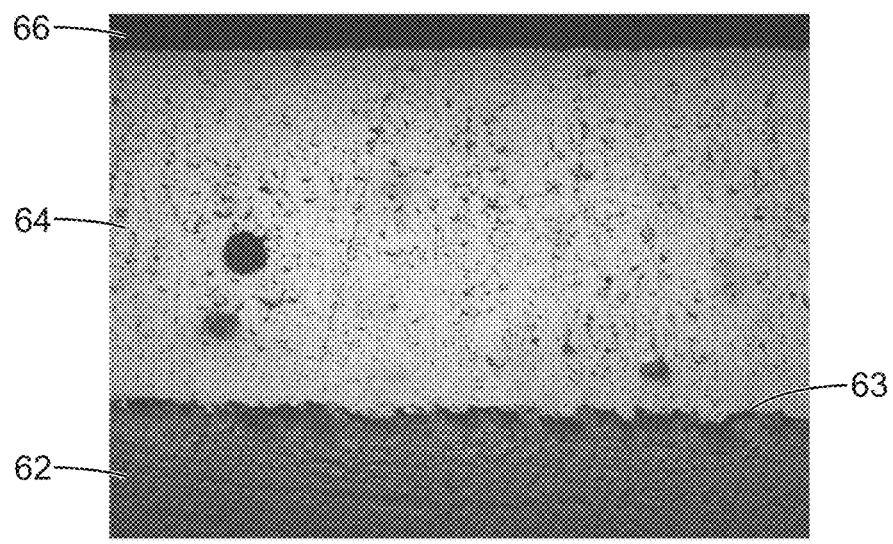
FIG. 6 is a fluorescence microscope image of a cross-section of a polyolefin layer that has been sanded to form a roughened polyolefin surface, according to Comparative Example 4.
Figure 7:
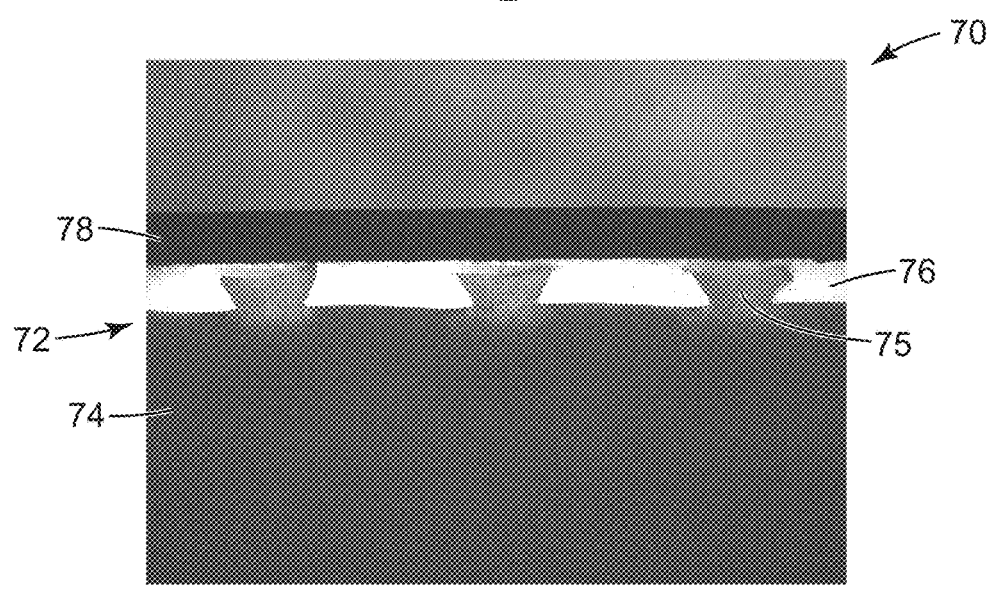
FIG. 7 is a fluorescence microscope image of a cross-section of a polyolefin first layer comprising a backing and a plurality of undercut features each having a funnel shape, extending from the backing, according to Example 7.

In certain embodiments, each of the plurality of undercut features extends from the integral backing a distance between 0.001 inch (in) (0.0254 millimeters (mm)) and 0.25 in (6.35 mm), or between 0.01 in (0.254 mm) and 0.1 in (2.54 mm), or between 0.005 in (0.127 mm) and 0.05 in (1.27 mm), or between 0.07 in (1.78 mm) and 0.25 in (2.54 mm). In preferred embodiments, each of the plurality of undercut features extends from the integral backing the same distance, or at least 90% of the plurality of undercut features extend from the integral backing a distance that is within 20% of the average distance of all of the undercut features. The extension of the undercut features from the integral backing according to the present disclosure is in contrast to prior attempts to enhance adhesive strength between two materials, in which a surface of one material is roughened in an attempt to form cracks in the surface. For example, FIG. 6 is a fluorescence microscope image of a cross-section of a polyolefin layer 62 that has been sanded to form a roughened polyolefin surface 63, according to Comparative Example 4 discussed in more detail below. An epoxy adhesive layer 64 is attached to the polyolefin layer 62, and a steel substrate 66 is attached to the epoxy adhesive layer 64. FIG. 7, in contrast, is a fluorescence microscope image of a cross-section of an article 70 comprising a polyolefin first layer 72 comprising a backing 74 and a plurality of undercut features 75 each having a funnel shape, extending from the backing, according to Example 7 discussed in more detail below. An epoxy adhesive layer 76 is interlocked with the plurality of undercut features 75 and a steel substrate 78 is attached to the epoxy adhesive layer 76.

Figure 4:
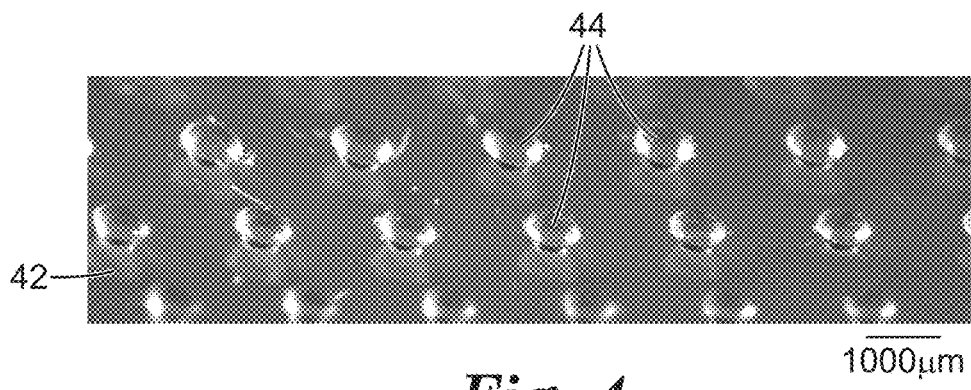
FIG. 4 is an optical microscopy image of a portion of a polypropylene layer comprising integrally formed undercut features having funnel shapes.

The arrangement of the plurality of undercut features on the backing is not particularly limited. In some embodiments the undercut features are located on the integral backing in a repeating pattern, for example a repeating pattern comprising each of the plurality of undercut features disposed equidistant from each of the immediately adjacent undercut features. Such a pattern is shown for instance in FIG. 4, which is an optical microscopy image of a portion of a polypropylene layer 42 comprising integrally formed funnel-shaped undercut features 44. Alternatively, in some embodiments the undercut features are located on the integral backing in a random arrangement.

As indicated above, the first layer comprises a polyolefin. The polyolefin is not particularly limited. In certain embodiments, the polyolefin comprises a melt index between 0.1 and 10 grams per 10 minutes (g/10 min), or between 0.5 and 5 g/10 min, or between 0.1 and 4 g/10 min. At a melt index of greater than about 10 g/10 min many (e.g., more than 50%) of the undercut features are deformed or broken during demolding. At a melt index of less than about 0.1 g/10 min, the resin may be too viscous to efficiently fill the mold cavity. Preferably, the polyolefin has a Shore D hardness of 59 or greater, or greater than 65, or greater than 70, or greater than 75, or greater than 80. Suitable polyolefin resins include for example and without limitation, polypropylene (e.g., a polypropylene homopolymer, a polypropylene copolymer, and/or blends comprising polypropylene), polyethylene (e.g., a polyethylene homopolymer, a polyethylene copolymer, high density polyethylene (HDPE) and/or medium density polyethylene (MDPE)), and combinations thereof. For linear low density polyethylene (LDPE), however, a temperature range was not found within which LDPE would have sufficient elasticity to be suitable as the polyolefin.

The adhesive is not particularly limited; for example, a suitable adhesive comprises an epoxy, a polyurea, an acrylic, a cyanoacrylate, a polyamide, a phenolic, a polyimide, or a polyurethane. In some embodiments the adhesive has a Shore D hardness (when cured) of greater than 59, or greater than 65, or greater than 70, or greater than 75, or greater than 80. Employing an adhesive having a Shore D hardness of 59 or less would potentially result in an article having insufficient integrity to resist failure upon subjection of the article to a load. Durometer hardness is a measured value of the resistance of a material to indentation, and is typically performed according to ASTM D2240, such as the Shore D hardness. Many commercially available materials are provided with a reported Shore D hardness value, which has a maximum of 85. Elastic modulus is another common property employed to characterize polymeric materials, such as adhesives. For instance, elastic modulus ($E_0$, in units of megapascals (MPa)) is typically measured according to ASTM D 638. Elastic modulus can be converted to Shore D hardness using the following equation: log $E_0$=0.0235S−0.6403; wherein $E_0$ is the elastic modulus and S is the Shore D hardness +50 ("Durometer Hardness And The Stress-Strain Behavior Of Elastomeric Materials", Qi, H. J.; Joyce, K; Boyce, M. C.; Rubber Chemistry and Technology, vol. 76, pp. 419-435, 2002).

The adhesive may include a thermosetting material or a thermoplastic material. The term "material" as used herein refers to monomers, oligomers, prepolymers, and/or polymers. The term "thermosetting" as used herein refers to a material, which undergoes a curing reaction that results in a chemical change upon bonding and an increase in the hardness of the material. The term "thermoset" as used herein refers to a thermosetting material which has been cured. A thermosetting material may generally be bonded by application of heat, actinic radiation such as UV, visible, or infrared, or microwave or X-ray energy. A thermosetting material may also be caused to cure by mixing two reactive components, for example, by mixing a monomer mixture or oligomer mixture with a curative mixture. The adhesive layer may include optional additives, and in the case of an adhesive material including a thermosetting material, may also include a curative or curatives.

The term "thermoplastic" as used herein refers to a material which undergoes a physical change upon the application of heat, i.e., the material flows upon bonding and returns to its initial non-flowing state upon cooling. A thermoplastic material is typically bonded by application of heat. Thermoplastic adhesives can include hot-melt adhesives. Preferably hot-melt adhesives of the present disclosure have a hardness or modulus at use temperature that matches or exceeds the properties of the polyolefin substrate. These hot-melt adhesives preferably include polyamides and polyesters.

The adhesive of the present disclosure can include a heat bondable layer which, upon application of heat, undergoes an initial decrease in viscosity which promotes wetting of the substrate and enhances adhesion and, in the case of, for example, a thermosetting material, causes a curing reaction. Actinic radiation such as UV, visible, or infrared; microwave or X-ray energy; or combinations thereof may be used to activate or complete bonding.

Thermosetting Material

An adhesive including a thermosetting material preferably, after bonding to the (non-polyolefin) substrate, has overlap shear strength according to ASTM D-1002-94, at room temperature (approximately 23° C.±3° C.), that approaches or exceeds the internal strength (typically the tensile strength) of the substrate, wherein the substrate is at least as strong as the form it would take in the intended application. An adhesive having an overlap shear strength of at least about 6.9 MPa, in accordance with ASTM D-1002-94, at room temperature (approximately 23° C.±3° C.) is considered to be a structural adhesive, as described in A. V. Pocius, "Adhesion and Adhesives Technology," Hanser/Gardner 1997, p. 183.

Suitable thermosetting materials include epoxides, urethanes, cyanate esters, polyimides, bismaleimides, phenolics, including nitrile phenolics, and any combinations thereof.

Epoxides

Suitable epoxides include those containing at least two 1,2-cyclic ethers. Such compounds can be saturated or unsaturated, aliphatic, aromatic or heterocyclic, or can include combinations thereof. Suitable epoxides may be solid or liquid at room temperature.

Compounds containing at least two epoxide groups (i.e., polyepoxides) are preferred. A combination of epoxide compounds may be employed, and an epoxide having a functionality of less than two may be used in a combination so long as the overall epoxide functionality of the mixture is at least two. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). It is also within the scope of this disclosure to use a material with functionality in addition to epoxide functionality but which is essentially unreactive with the epoxide functionality, for example, a material containing both epoxide and acrylic functionality. An optional additive is a core-shell toughener.

Examples of suitable epoxide-based adhesives that are commercially available include those available from 3M Company, St. Paul, Minn. under the trade designation "3M SCOTCH-WELD EPOXY ADHESIVE.

Urethane Materials

The term "urethane materials" as used herein applies to polymers made from the reaction product of a compound containing at least two isocyanate groups (—N=C=O), referred to herein as "isocyanates", and a compound containing at least two active-hydrogen containing groups. Examples of active-hydrogen containing groups include primary alcohols, secondary alcohols, phenols and water. Other active-hydrogen containing groups include primary and secondary amines which react with the isocyanate to form a urea linkage, thereby making a polyurea. A wide variety of isocyanate-terminated materials and appropriate co-reactants are well known, and many are commercially available (see, for example, Gunter Oertel, "Polyurethane Handbook", Hanser Publishers, Munich (1985)). Urethane adhesives can include two-part room temperature-curing adhesives. Urethane adhesives can also include one-part moisture curing adhesives that are applied when warm including those available from 3M company, St. Paul, Minn. under the trade designation "3M SCOTCH-WELD POLYURETHANE REACTIVE ADHESIVES".

Cyanate Ester Materials

Suitable cyanate ester materials (monomers and oligomers) are those having two or more —O—CN functional groups. Suitable cyanate ester compounds include the following: 1,3- and 1,4-dicyanatobenzene; 2-tert-butyl-1,4-dicyanatobenzene; 2,4-dimethyl-1,3-dicyanatobenzene; 2,5-di-tert-butyl-1,4-dicyanatobenzene; tetramethyl-1,4-dicyanatobenzene, 4-chloro-1,3-dicyanatobenzene; 1,3,5-tricyanatobenzene; 2,2,- or 4,4,-dicyanatobiphenyl; 3,3',5,5',-tetramethyl-4,4',-dicyanatobiphenyl; 1,3-, 1,4-, 1,5-, 1,6-, 1,8-, 2,6-, or 2,7-dicyanatonaphthalene; 1,3,6-tricyanatonaphthalene; bis(4-cyanatophenyl)methane; bis(3-chloro-4-cyanatophenyl)methane; bis(3,5-dimethyl-4-cyanatophenyl)methane; 1,1-bis(4-cyanatophenyl)ethane; 2,2-bis(4-cyanatophenyl)propane; 2,2-bis(3,5-dibromo-4-cyanatophenyl)propane; 2,2-bis(4-cyanatophenyl)-1,1,1,3,3,3-hexafluoropropane; bis(4-cyanatophenyl)ether; bis(4-cyanatophenoxyphenoxy)benzene; bis(4-cyanatophenyl)ketone; bis(4-cyanatophenyl)thioether; bis(4-cyanatophenyl)sulfone; tris(4-cyanatophenyl)phosphite; and tris(4-cyanatophenyl)phosphate. Polycyanate compounds obtained by reacting a phenol-formaldehyde precondensate with a halogenated cyanide are also suitable.

Phenolic Materials

Suitable phenolic resins are generally described in "Encyclopedia of Polymer Science and Engineering", Volume 11, John Wiley & Sons, Inc. (New York, 1988), pp. 45-92.

Phenolic-based resins are generally described in Alphonsus V. Pocius, "Adhesion and Adhesives Technology: An Introduction", Hanser Publishers (New York, 1997), pp. 185-188. Suitable phenolic materials are those made as the reaction product of phenols and formaldehydes, including resole phenolics and novolac phenolics. Examples of phenols include phenol, resorcinol, para-substituted phenol, cresol, and the reaction product of bisphenol-A and the monoglycidyl ether of bisphenol-A.

Examples of suitable bismaleimide materials, also known as N,N'-bismaleimide monomers and prepolymers, include the N,N'-bismaleimides of 1,2-ethanediamine, 1,6-hexanediamine, trimethyl-1,6-hexanediamine, 1,4-benzenediamine, 4,4'-methylene-bis(benzenamine), 2-methyl-1,4-benzenediamine, 3,3'-methylene-bis(benzenamine), 3,3'-sulfonyl-bis(benzenamine), 4,4'-sulfonyl-bis(benzenamine), 3,3'-oxy-bis(benzenamine), 4,4'-oxy-bis(benzenamine), 4,4'-methylene-bis(cyclohexanamine), 1,3-benzenedimethanamine, 1,4-benzenedimethanamine, and 4,4'-cyclohexane-bis(benzenamine) and mixtures thereof.

Curatives for Thermosetting Materials

A thermosetting adhesive layer preferably includes a thermosetting material and a curative or curatives. The term "curative" is used broadly to include not only those materials that are conventionally regarded as curatives but also those materials that catalyze or accelerate the reaction of the curable material as well as those materials that may act as both curative and catalyst or accelerator. It is also possible to use two or more curatives in combination.

Curatives for use in the present disclosure can include heat activated curatives that exhibit latent thermal reactivity;

that is, they react primarily at higher temperatures (preferably at a temperature of at least 80° C.), or react at lower temperatures only after an activation step such as exposure to actinic radiation. Curatives for use in the present disclosure can include curatives that are mixed with the thermosetting material before application to the substrates thereby causing the adhesive to cure at room temperature. One skilled in the art would readily understand which curatives are appropriate for each class of thermosetting materials.

Suitable curatives for epoxide polymerization include polybasic acids and their anhydrides; nitrogen-containing curatives; chloro-, bromo-, and fluoro-containing Lewis acids of aluminum, boron, antimony, and titanium; photochemically activated generators of protic or Lewis acids; and phenolic materials as described above.

Suitable curatives for urethane materials include the nitrogen-containing curatives as described for use with epoxides (which can react with a blocked isocyanate group after the deblocking reaction to give a urea) as well as, for example, materials containing hydroxyl (e.g., phenols) or thiol functionality that can react with the isocyanate. Photochemically activated generators of protic or Lewis acids can be used to enhance these reactions.

Suitable curatives for cyanate ester materials include the nitrogen-containing curatives as described for use with epoxides as well as curatives that may be thermally or photochemically activated. Examples of such curatives include organometallic compounds containing a cyclopentadienyl group ($C_5H_5$) and derivatives of a cyclopentadienyl group.

Suitable curatives for phenolic materials and for nitrile phenolic materials include hexamethylene tetraamine (a latent source of formaldehyde) as well as combinations of organic acids (e.g. phosphoric acid, para toluene sulfonic acid, and salicylic acid) and metallic oxides (e.g. zinc oxide and magnesium oxide).

Suitable curatives for bismaleimide materials include the nitrogen containing curatives as described for use with epoxides as well as latent sources of allyl phenol.

Acrylics

Suitable acrylic adhesives include free radically-curing acrylics and cyanoacrylates. The term "(meth)acrylic" as used herein refers to acrylic and methacrylic. (Meth)acrylic acid esters useful in the present disclosure preferably produce polymers with hardness or modulus that matches or exceeds the properties of the polyolefin substrate. The acrylic adhesives can include conventional additives such as plasticizers, tougheners, flow modifiers, neutralizing agents, stabilizers, antioxidants, fillers, colorants, and the like.

Suitable free radically-curing acrylics can include, but are not limited to, methyl methacrylate, methacrylic acid, tetrahydrofurfuryl methacrylate, isobornyl acrylate, and isobornyl methacrylate. Multifunctional (meth)acrylic acid esters can optionally be included as crosslinking agents. These multifunctional (meth)acrylates can include, but are not limited to, ethylene glycol dimethacrylate, 1,6-hexanediol dimethacrylate, 1,6-hexanediol diacrylate, trimethylolpropane triacrylate, pentaerythritol tetraacrylate, 1,2-ethylene glycol diacrylate, the dimethacrylate of ethylene oxide modified bisphenol A and the diacrylate of ethylene oxide modified bisphenol A.

The (meth)acrylic adhesives can be cured through free radical initiated polymerization. In one type of polymerization, the free radicals are generated by a redox reaction. Redox initiators can include peroxides, hydroperoxides, metal ions, saccharin, and N,N-dimethyl-p-toluidine. The free radicals can be generated in a two-part adhesive system that cures at room temperature after mixing or in a one-part adhesive system. The polymerization of the (meth)acylic adhesive monomers to form a polymer useful in the present disclosure can be carried out using thermal energy, electron-beam radiation, ultraviolet radiation, and the like. Such polymerizations can be facilitated by a polymerization initiator, which can be a thermal initiator or a photoinitiator. Examples of suitable photoinitiators include, but are not limited to, benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone.

Cyanoacrylate adhesives can include methyl cyanoacrylate and ethyl cyanoacrylate as well as other cyanoacrylate esters. They can optionally include additives such as hydroquinone. Preferably, the cyanoacrylate adhesive is chosen from adhesives sold by multiple companies under the name of Super Glue Gel, which have enhanced viscosity and appropriately long bondlines.

The substrate is not particularly limited, and preferably includes materials that are not LSE polymers. Suitable substrates comprise for example and without limitation, glass, metal, ceramic, wood, an acrylate, an epoxy, a urethane, a polyester, a polyamide, cardboard, leather, foam, fabric, acrylonitrile butadiene styrene polymer, polyvinyl chloride, or a combination thereof. Preferably the substrate comprises at least one flat major surface.

An advantage of aspects of the articles is that the inclusion of the undercut features results in an article that exhibits a peak load of at least 50 Newtons (N) as determined by a 180° peel test, or at least 100 N, or at least 150 N, or at least 200 N, or at least 250 N, or at least 300 N as determined by a 180° peel test. Similarly, inclusion of the undercut features results in an article that exhibits a peak load of at least 1000 Newtons (N) as determined by an overlap shear test, or at least 1500 N, or at least 200 N, or at least 2500 N as determined by an overlap shear test. The failure mode of the articles upon subjection to a high peak load varies depending on the specific materials of the articles. For instance, the article optionally fails by undercut feature deformation and/or breakage, by substrate yielding (e.g., deformation), by substrate failure, and/or by failure of the adhesion between the adhesive and the substrate.

Various Items are Described that are Articles or Methods of Making Articles.

Item 1 is an article comprising a multilayer structure, the multilayer structure including (a) a first layer including a plurality of undercut features formed on and extending from an integral backing, wherein the first layer is formed of a polyolefin; (b) a second layer comprising an adhesive having a Shore D hardness of greater than 59 when cured, wherein the second layer is interlocked with the plurality of undercut features; and (c) a third layer including a substrate. The third layer is adhered to the adhesive and the second layer is disposed between the first layer and the third layer.

Item 2 is an article of item 1, wherein each of the plurality of undercut features includes a stem extending from the integral backing.

Item 3 is an article of item 2, wherein the stem has a backdrafted shape.

Item 4 is an article of item 3, wherein the backdrafted shape includes a funnel shape.

Item 5 is an article of any one of items 2 through 4, wherein the stems of the plurality of undercut features all extend from the integral backing at the same angle.

Item 6 is an article of any one of items 2 through 5, wherein the stem of each of the plurality of undercut features has a shape including an increase in cross-sectional area from proximate to the integral backing to distal to the integral backing.

Item 7 is article of any one of items 2 through 6, wherein the stem of each of the plurality of undercut features has a single axis including one or more circular cross-sections.

Item 8 is an article of any one of items 2 through 7, wherein each of the plurality of undercut features includes a head formed on the stem, the head located distal to the integral backing.

Item 9 is an article of item 8, wherein the head of each of the plurality of undercut features includes a cross-sectional area greater than a cross-sectional area of the stem, and each head extends radially from the stem in at least three directions.

Item 10 is an article of item 8 or item 9, wherein the head of each of the plurality of undercut features includes one or more circular cross-sections.

Item 11 is an article of any one of items 8 through 10, wherein the head of each of the plurality of undercut features extends from the stem a distance between 0.005 in (0.127 mm) and 0.1 in (2.54 mm).

Item 12 is an article of any one of items 8 through 11, wherein the head of each of the plurality of undercut features extends from the stem a distance between 0.02 in (0.508 mm) and 0.1 in (2.54 mm).

Item 13 is an article of any one of items 8 through 11, wherein the head of each of the plurality of undercut features extends from the stem a distance between 0.005 in (0.127 mm) and 0.05 in (1.27 mm).

Item 14 is an article of any one of items 8 through 11, wherein the head of each of the plurality of undercut features extends from the stem a distance between 0.01 in (0.254 mm) and 0.05 in (1.27 mm).

Item 15 is an article of any one of items 1 through 14, wherein the plurality of undercut features includes a nail shape, a mushroom shape, or a combination thereof.

Item 16 is an article of any one of items 1 through 15, wherein 50% to 100% of the undercut features have the same geometry.

Item 17 is an article of any one of items 1 through 16, wherein 1% to 49% of the undercut features have different geometries from each other.

Item 18 is an article of any one of items 1 through 17, wherein each of the plurality of undercut features extends from the integral backing the same distance.

Item 19 is an article of any one of items 1 through 17, wherein at least 90% of the plurality of undercut features extend from the integral backing a distance that is within 20% of the average distance of all of the undercut features.

Item 20 is an article of any one of items 1 through 19, wherein each of the plurality of undercut features extends from the integral backing a distance between 0.001 inch (in) (0.0254 millimeters (mm)) and 0.25 in (6.35 mm).

Item 21 is an article of any one of items 1 through 20, wherein each of the plurality of undercut features extends from the integral backing a distance between 0.01 in (0.254 mm) and 0.1 in (2.54 mm).

Item 22 is an article of any one of items 1 through 19, wherein each of the plurality of undercut features extends from the integral backing a distance between 0.005 in (0.127 mm) and 0.05 in (1.27 mm).

Item 23 is an article of any one of items 1 through 19, wherein each of the plurality of undercut features extends from the integral backing a distance between 0.07 in (1.78 mm) and 0.25 in (2.54 mm).

Item 24 is an article of any one of items 1 through 23, wherein the plurality of undercut features is located on the integral backing in a repeating pattern.

Item 25 is an article of item 24, wherein the repeating pattern comprises each of the plurality of undercut features disposed equidistant from each of the immediately adjacent undercut features.

Item 26 is an article of any one of items 1 through 23, wherein the plurality of undercut features is located on the integral backing in a random arrangement.

Item 27 is an article of any one of items 1 through 26, wherein the polyolefin includes polypropylene or polyethylene.

Item 28 is an article of any one of items 1 through 27, wherein the polyolefin includes high density polyethylene (HDPE).

Item 29 is an article of any one of items 1 through 27, wherein the polyolefin includes a polypropylene copolymer.

Item 30 is an article of any one of items 1 through 27, wherein the polyolefin includes a polypropylene homopolymer.

Item 31 is an article of any one of items 1 through 30, wherein the adhesive includes an epoxy, a polyurea, an acrylic, a cyanoacrylate, a polyamide, a phenolic, a polyimide, or a polyurethane.

Item 32 is an article of any one of items 1 through 31, wherein the adhesive includes an epoxy.

Item 33 is an article of any one of items 1 through 32, wherein the adhesive has a Shore D hardness of greater than 75.

Item 34 is an article of any one of items 1 through 33, wherein the adhesive has a Shore D hardness of greater than 80.

Item 35 is an article of any one of items 1 through 34, wherein the substrate includes glass, metal, ceramic, wood, an acrylate, an epoxy, a urethane, a polyester, a polyamide, cardboard, leather, foam, fabric, acrylonitrile butadiene styrene polymer, polyvinyl chloride, or a combination thereof.

Item 36 is an article of any one of items 1 through 35, wherein the article exhibits a peak load of at least 50 Newtons (N) as determined by a 180° peel test.

Item 37 is an article of any one of items 1 through 36, wherein the article exhibits a peak load of at least 100 N as determined by a 180° peel test.

Item 38 is an article of any one of items 1 through 37, wherein the article exhibits a peak load of at least 150 N as determined by a 180° peel test.

Item 39 is an article of any one of items 1 through 37, wherein the article exhibits a peak load of at least 200 N as determined by a 180° peel test.

Item 40 is an article of any one of items 1 through 38, wherein the article exhibits a peak load of at least 250 N as determined by a 180° peel test.

Item 41 is an article of any one of items 1 through 40, wherein the article exhibits a peak load of at least 300 N as determined by a 180° peel test.

Item 42 is an article of any one of items 1 through 41, wherein the article exhibits a peak load of at least 1000 Newtons (N) as determined by an overlap shear test.

Item 43 is an article of any one of items 1 through 42, wherein the article exhibits a peak load of at least 1500 N as determined by an overlap shear test.

Item 44 is an article of any one of items 1 through 43, wherein the article exhibits a peak load of at least 2000 N as determined by an overlap shear test.

Item 45 is an article of any one of items 1 through 44, wherein the article exhibits a peak load of at least 2500 N as determined by an overlap shear test.

Item 46 is a method of forming an article having a multilayer structure, including (a) depositing a polyolefin resin into a mold cavity to form a first layer including a plurality of undercut features on and extending from an integral backing; (b) demolding the first layer from the mold cavity at a rate of at least 150 millimeters per minute (mm/min); (c) applying a curable adhesive to the plurality of undercut features to form a second layer attached to the first layer, the curable adhesive having a Shore D hardness of greater than 59 when cured; and (d) attaching a third layer comprising a substrate to the second layer. The second layer is disposed between the first layer and the third layer.

Item 47 is a method of item 46, wherein each of the plurality of undercut features includes a stem extending from the integral backing.

Item 48 is a method of item 47, wherein the stem has a backdrafted shape.

Item 49 is a method of item 48, wherein the backdrafted shape includes a funnel shape.

Item 50 is a method of any one of items 47 through 49, wherein the stems of the plurality of undercut features all extend from the integral backing at the same angle.

Item 51 is a method of any one of items 47 through 50, wherein the stem of each of the plurality of undercut features has a shape including an increase in cross-sectional area from proximate to the integral backing to distal to the integral backing.

Item 52 is a method of any one of items 47 through 51, wherein the stem of each of the plurality of undercut features has a single axis including one or more circular cross-sections.

Item 53 is a method of any one of items 47 through 52, wherein each of the plurality of undercut features includes a head formed on the stem, the head located distal to the integral backing.

Item 54 is a method of item 53, wherein the head of each of the plurality of undercut features includes a cross-sectional area greater than a cross-sectional area of the stem, and each head extends radially from the stem in at least three directions.

Item 55 is a method of item 53 or item 54, wherein the head of each of the plurality of undercut features comprises one or more circular cross-sections.

Item 56 is a method of any one of items 53 through 55, wherein the head of each of the plurality of undercut features extends from the stem a distance between 0.005 in (0.127 mm) and 0.1 in (2.54 mm).

Item 57 is a method of any one of items 53 through 56, wherein the head of each of the plurality of undercut features extends from the stem a distance between 0.02 in (0.508 mm) and 0.1 in (2.54 mm).

Item 58 is a method of any one of items 53 through 56, wherein the head of each of the plurality of undercut features extends from the stem a distance between 0.005 in (0.127 mm) and 0.05 in (1.27 mm).

Item 59 is a method of any one of items 53 through 56, wherein the head of each of the plurality of undercut features extends from the stem a distance between 0.01 in (0.254 mm) and 0.05 in (1.27 mm).

Item 60 is a method of any one of items 46 through 59, wherein the plurality of undercut features includes a nail shape, a mushroom shape, or a combination thereof.

Item 61 is a method of any one of items 46 through 60, further including heating the resin to a temperature above the melting temperature (Tm) of the polyolefin resin prior to depositing the polyolefin resin into the mold cavity.

Item 62 is a method of any one of items 46 through 61, further including cooling the polyolefin resin in the mold cavity by maintaining the temperature of the mold cavity at between 25° C. and below the $T_m$ of the polyolefin resin, prior to demolding the first layer from the mold cavity.

Item 63 is a method of any one of items 46 through 62, wherein the second layer is attached to the first layer via interlocking of the adhesive with the plurality of undercut features.

Item 64 is a method of any one of items 46 through 63, wherein when the demolding is performed the temperature of the mold cavity is maintained at a temperature between the $T_m$ of the polyolefin resin and 30° C. below the $T_m$ of the polyolefin resin.

Item 65 is a method of any one of items 46 through 64, further including curing the curable adhesive after attaching the third layer to the second layer.

Item 66 is a method of any one of items 46 through 65, wherein the polyolefin includes a melt index between 0.1 and 10 grams per 10 minutes (g/10 min).

Item 67 is a method of any one of items 46 through 66, wherein the polyolefin includes a melt index between 0.5 and 5 g/10 min.

Item 68 is a method of any one of items 46 through 66, wherein the polyolefin includes a melt index between 0.1 and 4 g/10 min.

Item 69 is a method of any one of items 46 through 68, wherein the temperature of the mold cavity is maintained at between 50° C. and 200° C.

Item 70 is a method of any one of items 46 through 69, wherein the temperature of the mold cavity is maintained at between 100° C. and 150° C.

Item 71 is a method of any one of items 46 through 70, wherein the polyolefin is polypropylene and the temperature of the mold cavity is maintained at between 130° C. and 170° C.

Item 72 is a method of any one of items 46 through 71, wherein the polyolefin is polypropylene and the temperature of the mold cavity is maintained at between 145° C. and 150° C.

Item 73 is a method of any one of items 46 through 70, wherein the polyolefin is high density polyolefin (HDPE) and the temperature of the mold cavity is maintained between 110° C. and 135° C.

Item 74 is a method of any one of items 46 through 70, wherein the polyolefin is high density polyolefin (HDPE) and the temperature of the mold cavity is maintained between 115° C. and 125° C.

Item 75 is a method of any one of items 46 through 74, wherein the depositing of the polyolefin resin into a mold cavity includes roll molding, injection molding, extrusion molding, vacuum molding, or a combination thereof.

Item 76 is a method of any one of items 46 through 75, wherein the depositing of the polyolefin resin into a mold cavity includes roll molding.

Item 77 is a method of any one of items 46 through 76, including demolding the first layer from the mold cavity at a rate of at least 250 mm/min.

Item 78 is a method of any one of items 46 through 77, including demolding the first layer from the mold cavity at a rate of at least 400 mm/min.

Item 79 is a method of any one of items 46 through 78, including demolding the first layer from the mold cavity at a rate of at least 500 mm/min.

Item 80 is a method of any one of items 46 through 76, including demolding the first layer from the mold cavity at a rate between 150 mm/min and 550 mm/min.

Item 81 is a method of any one of items 46 through 77, including demolding the first layer from the mold cavity at a rate between 150 mm/min and 300 mm/min.

Item 82 is a method of any one of items 46 through 80, including demolding the first layer from the mold cavity at a rate between 350 mm/min and 550 mm/min.

Item 83 is a method of any one of items 46 through 78, including demolding the first layer from the mold cavity at a rate between 250 mm/min and 500 mm/min.

Item 84 is a method of any one of items 46 through 83, wherein 50% to 100% of the undercut features have the same geometry.

Item 85 is a method of any one of items 46 through 84, wherein 1% to 49% of the undercut features have different geometries from each other.

Item 86 is a method of any one of items 46 through 85, wherein each of the plurality of undercut features extends from the integral backing the same distance.

Item 87 is a method of any one of items 46 through 86, wherein at least 90% of the plurality of undercut features extend from the integral backing a distance that is within 20% of the average distance of all of the undercut features.

Item 88 is a method of any one of items 46 through 87, wherein each of the plurality of undercut features extends from the integral backing a distance between 0.001 inch (in) (0.0254 millimeters (mm)) and 0.25 in (6.35 mm).

Item 89 is a method of any one of items 46 through 88, wherein each of the plurality of undercut features extends from the integral backing a distance between 0.01 in (0.254 mm) and 0.1 in (2.54 mm).

Item 90 is a method of any one of items 46 through 88, wherein each of the plurality of undercut features extends from the integral backing a distance between 0.005 in (0.127 mm) and 0.05 in (1.27 mm).

Item 91 is a method of any one of items 46 through 88, wherein each of the plurality of undercut features extends from the integral backing a distance between 0.07 in (1.78 mm) and 0.25 in (2.54 mm).

Item 92 is a method of any one of items 46 through 91, wherein the plurality of undercut features is located on the integral backing in a repeating pattern.

Item 93 is a method of item 92, wherein the repeating pattern includes each of the plurality of undercut features disposed equidistant from each of the immediately adjacent undercut features.

Item 94 is a method of any one of items 46 through 91, wherein the plurality of undercut features is located on the integral backing in a random arrangement.

Item 95 is a method of any one of items 46 through 94, wherein the polyolefin includes polypropylene or polyethylene.

Item 96 is a method of any one of items 46 through 95, wherein the polyolefin includes high density polyethylene (HDPE).

Item 97 is a method of any one of items 46 through 95, wherein the polyolefin includes a polypropylene copolymer.

Item 98 is a method of any one of items 46 through 95, wherein the polyolefin includes a polypropylene homopolymer.

Item 99 is a method of any one of items 46 through 98, wherein the adhesive includes an epoxy, a polyurea, an acrylic, a cyanoacrylate, a polyamide, a phenolic, a polyimide, or a polyurethane.

Item 100 is a method of any one of items 46 through 99, wherein the adhesive includes an epoxy.

Item 101 is a method of any one of items 46 through 100, wherein the adhesive has a Shore D hardness of greater than 75.

Item 102 is a method of any one of items 46 through 101, wherein the adhesive has a Shore D hardness of greater than 80.

Item 103 is a method of any one of items 46 through 102, wherein the substrate includes glass, metal, ceramic, wood, an acrylate, an epoxy, a urethane, a polyester, a polyamide, cardboard, leather, foam, fabric, acrylonitrile butadiene styrene polymer, polyvinyl chloride, or a combination thereof.

Item 104 is a method of any one of items 46 through 103, wherein the article exhibits a peak load of at least 50 Newtons (N) as determined by a 180° peel test.

Item 105 is a method of any one of items 46 through 104, wherein the article exhibits a peak load of at least 100 N as determined by a 180° peel test.

Item 106 is a method of any one of items 46 through 105, wherein the article exhibits a peak load of at least 150 N as determined by a 180° peel test.

Item 107 is a method of any one of items 46 through 106, wherein the article exhibits a peak load of at least 200 N as determined by a 180° peel test.

Item 108 is a method of any one of items 46 through 107, wherein the article exhibits a peak load of at least 250 N as determined by a 180° peel test.

Item 109 is a method of any one of items 46 through 108, wherein the article exhibits a peak load of at least 300 N as determined by a 180° peel test.

Item 110 is a method of any one of items 46 through 109, wherein the article exhibits a peak load of at least 1000 Newtons (N) as determined by an overlap shear test.

Item 111 is a method of any one of items 46 through 110, wherein the article exhibits a peak load of at least 1500 N as determined by an overlap shear test.

Item 112 is a method of any one of items 46 through 111, wherein the article exhibits a peak load of at least 2000 N as determined by an overlap shear test.

Item 113 is a method of any one of items 46 through 112, wherein the article exhibits a peak load of at least 2500 N as determined by an overlap shear test.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Chemical Company, St. Louis, Mo.

Test Methods

180° Peel Test Method

The end of the metal substrate with the overhanging polyolefin sheet was placed in one clamp of a Sintech load frame (MTS Systems, Eden Prairie, Minn.) equipped with a 1000 pound force (lbf) (4450 N) capacity load cell and in a 23° C. environment. The polyolefin sheet was then bent back nominally 180° and placed in the second clamp of the load frame. The clamps were then separated at a rate of 51 mm/minute to produce a 180° peel. The peak loads from each of the replicate tests were averaged.

Rolling Peel Test Method

A roller fixture equivalent to the fixture in FIG. 1 of ASTM D3167-10 was mounted on an MTS Insight 30 load frame equipped with a 200 lbf (890 N) capacity load cell in a 23° C. environment. The metal substrate was placed in this roller fixture, and the polyolefin sheet was then fed through the fixture and placed in the clamp of the load frame to produce a peel geometry of approximately 135°. The clamps were then separated at a rate of 51 mm/minute. The peak loads from each of the replicate tests were averaged and reported. In addition, the average peel load over the full peel distance for each test was calculated, and the average values for each replicate test were averaged and reported.

Overlap Shear Test Method

Samples were prepared with an overlap area of 25 mm×25 mm. One end of each substrate was placed in each clamp of a Sintech load frame equipped with a 1000 lbf (4450 N) capacity load cell and in a 23° C. environment. The clamps were separated at a rate 51 mm/minute until failure of the sample. The peak loads from each of the replicate tests were averaged.

Materials:

Tool #1. An aluminum plate (203 mm×127 mm×0.5 mm) was drilled with an array of holes (9 holes×18 holes) that were 1.5 mm in diameter with centers spaced 2.7 mm apart. The holes were then redrilled with a diameter of 2.0 mm, but only to a depth of 0.18 mm. The resulting holes each had a section that was 2.0 mm in diameter and another section that was 1.5 mm in diameter.

Tool #2. An aluminum plate (152 mm×76 mm×0.25 mm) was drilled with an array of holes (12 holes×12 holes) with centers spaced 2.0 mm apart. A cutting bit with a taper angle of approximately 27° was used such that each of the holes had a taper from a diameter of 1.0 mm on one face of the plate to a diameter of 0.76 mm on the opposite face of the plate Tool #3. An aluminum plate (305 mm×152 mm×0.5 mm) was drilled with an array of holes (9 holes×36 holes) with centers spaced 2.7 mm apart. A cutting bit with a 30° taper angle was used such that each of the holes had a taper from a diameter of 2.0 mm on one face of the plate to a diameter of 1.5 mm on the opposite face of the plate.

Tool #4. An aluminum plate (152 mm×76 mm×0.51 mm) was drilled with an array of holes (6 holes×6 holes) with centers spaced 4.1 mm apart. A cutting bit with a taper angle of approximately 27° was used such that the holes had a taper from a diameter of 2.0 mm on one face of the plate to a diameter of 1.5 mm on the opposite face of the plate.

Example 1. Polypropylene Nail Shape Samples and Adhesive Assemblies

Tool #1 was sprayed lightly with Mold Release A. An aluminum shim plate (203 mm×127 mm×0.76 mm) with a

| Material | Description | Source |
| --- | --- | --- |
| Mold Release A | Silicone Aerosol Spray | 3M SILICONE LUBRICANT 85822 from 3M, St. Paul, MN. |
| Mold Release B | Aerosol food grade silicone release agent | MR303 Food Grade Release Agent from Sprayon Products, Cleveland, OH |
| MFI-0.5 PP | Polypropylene with a melt flow index of 0.5 g/10 min | Product number 427853 from Sigma-Aldrich. |
| MFI-4 PP | Polypropylene with a melt flow index of 4 g/10 min | Product number 427862 from Sigma-Aldrich. |
| MFI-35 PP | Polypropylene with a melt flow index of 35 g/10 min | Product number 427896 from Sigma-Aldrich. |
| MFI-2.2 HDPE | High-density polyethylene with a melt flow index of 2.2 g/10 min | Product number 547999 from Sigma-Aldrich. |
| MFI-12 HDPE | High-density polyethylene with a melt flow index of 12 g/10 min | Product number 427985 from Sigma-Aldrich. |
| MFI-42 HDPE | High-density polyethylene with a melt flow index of 42 g/10 min | Product number 428019 from Sigma-Aldrich. |
| PP Sheet | Natural polypropylene sheet | Plastics International, Eden Prairie, MN |
| ABS Sheet | Natural acrylonitrile-butadiene-styrene polymer sheet | Plastics International, Eden Prairie, MN |
| DP-100 | Rigid two-part epoxy adhesive with a reported Shore D hardness of 80-85 | SCOTCH-WELD DP-100 Clear from 3M, St. Paul, MN. |
| DP 460 NS | Rigid two-part epoxy adhesive with a reported Shore D hardness of 78-84 | SCOTCH-WELD DP-460 NS from 3M, St. Paul, MN. |
| DP805 | Two-part toughened acrylic adhesive with a reported Shore D hardness of 79 | SCOTCH-WELD DP805 from 3M, St. Paul, MN. |
| TE030 | One-component, moisture curing urethane adhesive with a reported Shore D hardness of 60 | SCOTCH-WELD POLYURETHANE REACTIVE ADHESIVE TE030 from 3M, St. Paul, MN. |
| 4000 UV | One-part adhesive sealant with a polyether base and a reported Shore A hardness of 38-39 | MARINE ADHESIVE/SEALANT FAST CURE 4000 UV 05280 from 3M, St. Paul, MN. |
| Steel Coupon | Iron-phosphated type "RS" steel, 102 mm × 25 mm × 1.6 mm | Q-Lab Corporation, Cleveland, OH |
| Stainless Coupon | Type 304 Stainless Steel, 102 mm × 25 mm × 0.9 mm | Joseph T. Ryerson & Son, Inc., Chicago, IL | rectangular cutout of 152 mm×25 mm was placed on the surface of the tool that had the smaller diameter hole openings. Pellets of MFI-4 PP were placed on the tool within the opening of the shim plate, to form an assembly. Polyester liners were placed over both faces of the assembly. The assembly was placed in a hydraulic press with both platens heated to 190° C. The assembly was allowed to warm for 1 minute, and 53 kN of force was then applied for an additional 1 minute. The sample was removed from the press and allowed to cool, and the liners were removed. The assembly was then returned to an oven at a temperature of 150° C. for two minutes. While still in the oven, the molded polypropylene strip was quickly removed from the tool by hand. The resulting film had a 9×18 array of molded features that had a diameter of 1.5 mm at the base of each feature where it contacts the film surface and a diameter of 2.0 mm at the tip of each feature.

An excess of DP-100 epoxy was applied to the pattern of nail shaped undercut features, and the patterned area was then placed against a steel coupon. A glass plate and at least 1 kg of weight were placed on the assembly, and it was allowed to cure for 24 hours at room temperature. The average peak load for five specimens in 180° peel testing was 380 N, and they all failed by substrate failure of the polypropylene. The average peak load for five specimens in rolling peel testing was 140 N with an average peel load of 69 N. The samples failed primarily by cohesive failure of the epoxy with one sample undergoing substrate failure.

Comparative Example 1. Adhesive Testing of Inverted Polypropylene Nail Shape Samples The procedure of Example 1, including the preparation of adhesive test specimens, was repeated except that the shim and resin were applied to the face of the tool with the larger diameter hole openings. The molded sample was removed from the tool at room temperature. The molded sample had an array of features that each had a diameter of 2.0 mm at the base and a diameter of 1.5 mm at the tip.

The average peak load for five specimens under 180° peel testing was 25 N with adhesive failure at the polypropylene/epoxy interface. The average peak load for rolling peel testing of five specimens was 16 N with an average peel load of 12 N. The failure mode was adhesive failure at the epoxy/polypropylene interface.

Example 2. Adhesive Testing of Polypropylene Funnel-Shaped Samples

The procedure of Example 1 was repeated, but Tool #3 was used. The resulting molded film had a 9×36 array of features with a diameter of 1.5 mm at the base of each feature and a gradual taper to a 2.0 mm diameter at the tip of each feature. The average peak load for five adhesive specimens in 180° peel testing was 335 N with substrate failure observed with all five samples. The average peak load for rolling peel testing of five specimens was 170 N with an average peel load of 71 N. The samples failed by mixed modes including cohesive failure of the epoxy and substrate failure.

Comparative Example 2. Adhesive Testing of Inverted Polypropylene Funnel-Shaped Samples The procedure of Example 2 was repeated except that the shim and resin were applied to the face of the tool with the larger diameter hole openings. The molded sample was removed from the tool at room temperature. The molded sample had an array of features with a diameter of 2.0 mm at the base and a diameter of 1.5 mm at the tip. The average peak load for five adhesive specimens under 180° peel testing was 1 N with adhesive failure at the polypropylene/epoxy interface. The average peak and average peel loads for rolling peel testing of five specimens was 2 N. The failure mode was adhesive failure at the epoxy/polypropylene interface.

Example 3. Adhesive Testing of HDPE Nail Shape Samples

The procedure of Example 1 was repeated, except for using MFI-2.2 HDPE with the press at 177° C., and with the demolding oven set at 125° C. The resulting film had a 9×18 array of molded features that each had a diameter of 1.5 mm at the base (i.e. where the feature contacts the film surface) and a diameter of 2.0 mm at the tip. The average peak load for five adhesive specimens in 180° peel testing was 292 N with substrate failure observed with all five samples. The average peak load for rolling peel testing of five specimens was 138 N with an average peel load of 95 N. The samples failed by adhesive failure at the epoxy/HDPE interface with noticeable deformation of the nail shaped undercut features.

Comparative Example 3. Adhesive Testing of Inverted Nail Shape HDPE Samples

The procedure of Example 3 was repeated except that the shim and resin were applied to the face of the tool with the larger diameter hole openings. The molded sample was removed from the tool at room temperature. The molded sample had an array of features with a diameter of 2.0 mm at the base and a diameter of 1.5 mm at the tip. The average peak load for six specimens under 180° peel testing was 25 N with adhesive failure at the polypropylene/epoxy interface. The average peak load for rolling peel testing of five specimens was 17 N with an average peel load of 12 N. The failure mode was adhesive failure at the epoxy/polypropylene interface.

Example 4. Adhesive Testing of HDPE Funnel-Shaped Samples

The procedure of Example 3 was repeated, but Tool #3 was used. The resulting molded film had a 9×36 array of features with a diameter of 1.5 mm at base of each feature and a gradual taper to a 2.0 mm diameter at the tip of each feature. The average peak load for five specimens under 180° peel testing was 249 N with substrate failure observed with all specimens. The average peak load for rolling peel testing of five specimens was 137 N with an average peel load of 80 N. The samples primarily failed by adhesive failure at the epoxy/HDPE interface with noticeable deformation of the backdrafted features.

Example 5. Overlap Shear Adhesion to Steel

Tool #4 was sprayed lightly with Mold Release A. A piece of PP Sheet (102 mm×51 mm×3.2 mm) was placed on the tool in contact with the face with smaller diameter openings. This assembly was placed in a hydraulic press with the bottom platen at 160° C. and the top platen not heated. The press was closed without application of pressure, and the assembly was allowed to warm for 30 seconds. A force of 133 kN was then applied for an additional 60 seconds. The press was opened, and, with the tool remaining on the bottom platen, the polypropylene was quickly removed by hand. The result was an array of 0.51 mm high funnel-shaped features on a coupon that remained more than 3 mm thick. These samples were cut to strips 25 mm wide.

Five of these strips were then adhered to steel coupons (as used in Example 1) using DP-100 applied to the patterned area of the polymer and with an overlap area of 25 mm×25 mm. The adhesive was allowed to cure at room temperature for 16 hours and then post cured at 85° C. for 1 hour. The average peak load in overlap shear testing was 2600 N with multiple failure modes including substrate failure of the polypropylene and adhesive failure at the epoxy-polypropylene interface with deformation of the features.

Example 6. Overlap Shear Adhesion to Steel with 0.25 mm Feature Height

Overlap shear specimens were prepared with the sample process described in Example 5, except Tool #2 was used resulting in backdrafted features that were 0.25 mm high. The average peak load in overlap shear testing was 1500 N with adhesive failure at the epoxy-polypropylene interface including deformation of the features.

Example 7. Overlap Shear Adhesion to Stainless Steel with Epoxy Adhesive

Tool 4 was sprayed lightly with Mold Release B. A piece of PP Sheet (100 mm×50 mm×6 mm) was placed on the tool in contact with the face with smaller diameter openings. This assembly was placed in a hydraulic press with the bottom platen at 160° C. and the top platen not heated. The press was closed without application of pressure, and the assembly was allowed to warm for 30 seconds. A force of 133 kN was then applied for an additional 60 seconds. The press was opened, and, with the tool remaining on the bottom platen, the polypropylene was quickly removed by hand. The result was an array of 0.51 mm-high backdrafted funnel-shaped features on a PP coupon that remained more than 5.5 mm thick.

The heights of each of the 36 backdrafted features on one of these samples were measured. The average height was 0.031 inches (0.79 mm), the smallest measured height was 0.027 inches (0.69 mm), and the tallest measured height was 0.039 inches (0.99 mm). The standard deviation for the 36 measurements was 0.0030 inches (0.077 mm) and the relative standard deviation was 9.7%. Only two features extended from the backing a distance that was not within 20% of the average distance of the 36 features.

A Stainless Coupon was lightly roughened with a SCOTCH-BRITE PAD (obtained from 3M, St. Paul, Minn.). Both substrates were then wiped with isopropanol and allowed to dry. They were then bonded in an overlap shear configuration with a 25 mm×25 mm overlap area using DP460 NS. Each specimen was held together with binder clips for more than 12 hours. The clips were then removed, and the specimens were placed in a 70° C. oven for 30 minutes. The excess polypropylene was removed from the edges of the specimens with a saw to produce samples 26 mm wide. Upon Overlap Shear Testing, two specimens produced an average peak load of 2060 N.

A third specimen was sectioned to expose one row of the patterned backdrafted features. Referring to FIG. 7, fluorescence microscopy with a Carl Zeiss Lumar V12 stereo microscope with Zeiss Filter Set 38 (Excitation with 450 nm-500 nm) showed that the six features 75 each had the same geometry and had uniform spacing that matched the geometries of the cavities in Tool 4. Each of the features was embedded in the epoxy layer 76 to create an interference (e.g., "interlock") fit.

Comparative Example 4. Overlap Shear Adhesion to Stainless Steel with Epoxy

Pieces of PP Sheet (100 mm×27 mm×6 mm) were aggressively roughened using 100 grit 3M Series 431Q sandpaper. A Stainless Coupon was lightly roughened with a SCOTCH-BRITE PAD. Both substrates were then wiped with isopropanol and allowed to dry. They were then bonded in an overlap shear configuration with a 25 mm×25 mm overlap area using DP460 NS. Each specimen contained two lengths of 0.010" (0.25 mm) diameter stainless steel wire in the bondline to help control the thickness of the bondline. Each specimen was held together with binder clips for more than 12 hours. The clips were then removed, and the samples were placed in a 70° C. oven for 30 minutes. The edges of each specimen were abraded to remove the slight overhang of polypropylene, and the exposed polypropylene edge was polished for imaging. Referring to FIG. 6, fluorescence microscopy showed that the polypropylene surface 63 had randomly shaped and randomly spaced features resulting from the sanding. The majority of the features did not represent pronounced undercuts, and none of the observed features exceeded a height of 100 microns. Upon Overlap Shear Testing, two samples produced an average peak load of 750 N.

Example 8. Overlap Shear Adhesion to Wood with Polyurethane

Backdrafted features were prepared on polypropylene coupons using the same procedure as Example 7. The resulting coupons were then cut with a saw to a width of 26 mm with all the backdrafted features at one end of the coupon. TE030 adhesive was heated to 121° C. and applied to the features on the polypropylene, and an oak coupon (100 mm×25 mm×13 mm) was applied to the adhesive to create an overlap shear configuration with a 25 mm×25 mm overlap area and the assembly was secured with a binder clip. After resting at room temperature for 48 hours the samples were subjected to Overlap Shear Testing. Two specimens produced an average peak load of 1000 N, and the samples failed at the polypropylene/adhesive interface with visible deformation of the adhesive cavities that had contained the backdrafted features.

Example 9. Overlap Shear Adhesion to Acrylonitrile Butadiene Styrene (ABS) Polymer with Acrylic Adhesive Backdrafted features were prepared on polypropylene coupons 26 mm wide using the same procedure as Example 8. Natural ABS coupons (100 mm×25 mm×3 mm) were prepared by wiping with isopropanol, sanding with 220 grit sandpaper, and wiping again with isopropanol. A layer of DP805 adhesive was applied to the features on the polypropylene, and the ABS coupon was then applied to create an overlap shear configuration with a 25 mm×25 mm overlap area. The assemblies were secured with two binder clips each. After resting at room temperature for 48 hours the samples were subjected to Overlap Shear Testing. Two specimens produced an average peak load of 1710 N, and the samples failed at the polypropylene/adhesive interface.

There was visible damage at the base of some of the backdrafted features for both specimens.

Comparative Example 5. Overlap Shear Adhesion to ABS Polymer with Acrylic Adhesive Pieces of PP Sheet (100 mm×27 mm×6 mm) were aggressively roughened using 100 grit 3M Series 431Q sandpaper and then wiped with isopropanol. Natural ABS coupons (100 mm×25 mm×3 mm) were prepared by wiping with isopropanol, sanding with 220 grit sandpaper, and wiping again with isopropanol. A layer of DP805 adhesive was applied to the polypropylene. Two pieces of stainless steel wire 0.25 mm in diameter and more than 25 mm long were placed in the adhesive layer to act as bondline spacers. An ABS coupon was then applied to the adhesive to create an overlap shear configuration with a 25 mm×25 mm overlap area. The assemblies were secured with two binder clips each. After resting at room temperature for 48 hours the samples were subjected to Overlap Shear Testing. Two specimens produced an average peak load of 940 N, and the samples failed at the polypropylene/adhesive interface.

Comparative Example 6. Soft Adhesive

Backdrafted features were prepared on polypropylene coupons 26 mm wide using the same procedure as Example 8. 4000 UV adhesive was added to the polypropylene, and an oak coupon (100 mm×25 mm×13 mm) was applied to the adhesive to create an overlap shear configuration with a 25 mm×25 mm overlap area. The assembly was secured with two binder clips and allowed to rest for five days. The specimen was then subjected to Overlap Shear Testing to produce a peak load of 41 N. The sample failed at the polypropylene/adhesive interface.

Preparatory Examples 1, 2 and 3 show the conditions that are required to mold undercut features (and in some cases backdrafted features) that are appropriate for creating assemblies with high adhesive strength.

Preparatory Example 1. Polypropylene Patterning with Varying Melt Index and Temperature Tool #1 was sprayed lightly with Mold Release A. An aluminum shim plate (203 mm×127 mm×0.76 mm) with a rectangular cutout of 152 mm×25 mm was placed on the surface of the tool with the smaller diameter hole openings. Pellets of MFI-0.5 PP, MFI-4 PP, or MFI-35 PP were placed on the tool within the opening of the shim plate. Polyester liners were placed over both faces of the assembly. The assembly was placed in a hydraulic press with both platens heated to 190° C. The assembly was allowed to warm for 1 minute, and 53 kN of force was then applied for an additional 1 minute. The sample was removed from the press and allowed to cool, and the liners were removed. The assembly was then returned for two minutes to an oven at a temperature setting that was varied from 110° C. to 150° C. While still in the oven, the molded polypropylene strip was quickly removed from the tool by hand. The results of these tests are shown in Table 1.

With the higher demolding temperatures, the nail shaped undercut features remained well-formed after removal from the mold. With lower demolding temperatures, two main types of defects emerged. In some cases, individual features had a portion of the rim of the nail heads sheared off or had entire portions of the stem broken off. In other cases, the force from peeling the polypropylene off the tool became sufficient to deform the backing at the base of each row of stems.

TABLE 1

Results From Molding Polypropylene Nail Shaped Undercut Features

| Demolding Oven T | Polypropylene Melt Index | | |
|---|---|---|---|
| | 0.5 g/10 min | 4 g/10 min | 35 g/10 min |
| 150° C. | Well-Formed | Well-Formed | Some Broken Features |
| 145° C. | Well-Formed | Well-Formed | Many Broken Features Baking Deformation |
| 140° C. | Well-Formed | Backing Deformation | Not Tested |
| 135° C. | Backing Deformation | Backing Deformation | Not Tested |
| 130° C. | One Broken Feature Backing Deformation | Some Broken Features Backing Deformation | Not Tested |
| 120° C. | Many Broken Features Backing Deformation | Some Broken Features Backing Deformation | Not Tested |
| 110° C. | Many Broken Features Backing Deformation | Many Broken Features Backing Deformation | Not Tested |

Preparatory Example 2. HDPE Patterning with Varying Melt Index and Temperature The mold assembly used in Preparatory Example 1 was used, except that MFI-2.2 HDPE, MFI-12 HDPE, or MFI-42 HDPE was tested. The procedure from Preparatory Example 1 was used, except that the hydraulic press platens were heated to 177° C. and the oven temperature setting was varied from 100° C. to 140° C.

Unlike the features in Example 1, the HDPE heads of the nail shaped undercut features tended to retain some deformation after demolding. Particularly, the heads remained somewhat cupped on top rather than flat, and there was some waviness in the rims of the heads. At high temperatures, the backing tended to yield rather than pull the features out of the tool. At lower temperatures, particularly with the high melt-index resins, the backing tended to fail (without noticeable yielding) rather than to pull the features out of the tool. The results are noted in Table 2 below.

TABLE 2

Results From Molding HDPE Nail-Head Stems

| Demolding Oven T | HDPE Melt Index | | |
|---|---|---|---|
| | 2.2 g/10 min | 12 g/10 min | 42 g/10 min |
| 140° C. | Backing Yielded | Backing Yielded | Not Tested |
| 135° C. | Some Broken Features | Many Broken Features | Backing Yielded |
| 130° C. | Some Broken Features | Many Broken Features | Some Broken Features Backing Yielded |
| 125° C. | Well-Formed | Some Broken Features | Backing Failed |
| 120° C. | Well-Formed | Some Broken Features | Some Broken Features Backing Failed |
| 115° C. | Well-Formed | Some Broken Features | Backing Failed |
| 110° C. | Some Broken Features | Some Broken Features Backing Failed | Not Tested |
| 105° C. | Many Broken Features | Many Broken Features Backing Failed | Not Tested |
| 100° C. | Many Broken Features | Many Broken Features Backing Failed | Not Tested |

Preparatory Example 3. Polypropylene Patterning with Varying Demolding Rates

Tool #1 was filled with MFI-4 PP using the method from Preparatory Example 1. To demold the sample, the shim plate was carefully removed at room temperature, and the unpatterned portion of the molded sample was carefully peeled away from the tool. A Sintech load frame equipped with an oven at 150° C. was used to remove the sample from the tool in a 180° peel mode. The free portion of the sample was loaded in one grip of the load frame, and the tool was loaded in to other grip. The sample was left in the oven for 5 minutes, and was then peeled at 25 mm/min, 127 mm/min, or 508 mm/min.

With a peel rate of 508 mm/min, the peak load was 16 N, and the sample was well-formed. Peel rates of 25 mm/min and 127 mm/min gave peak loads of 29 N and 23 N, respectively, and both samples showed significant backing deformation at the base of each row of features.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. An article comprising a multilayer structure, the multilayer structure comprising:
   (a) a first layer comprising a plurality of undercut features formed on and extending from an integral backing, wherein the first layer is formed of a polyolefin;
   (b) a second layer comprising an adhesive having a Shore D hardness of greater than 59 when cured, wherein the second layer is interlocked with the plurality of undercut features; and
   (c) a third layer comprising a substrate, wherein the third layer is adhered to the adhesive and wherein the second layer is disposed between the first layer and the third layer;
   wherein the article exhibits a peak load of at least 150 N as determined by a 180° peel test.

2. The article of claim 1, wherein each of the plurality of undercut features comprises a stem extending from the integral backing.

3. The article of claim 2, wherein the stem comprises a backdrafted shape.

4. The article of claim 2, wherein the stems of the plurality of undercut features all extend from the integral backing at the same angle.

5. The article of claim 2, wherein each of the plurality of undercut features comprises a head formed on the stem, the head located distal to the integral backing.

6. The article of claim 5, wherein the head of each of the plurality of undercut features comprises a cross-sectional area greater than a cross-sectional area of the stem, and each head extends radially from the stem in at least three directions.

7. The article of claim 1, wherein the plurality of undercut features comprises a nail shape, a mushroom shape, or a combination thereof.

8. The article of claim 1, wherein 50% to 100% of the undercut features comprise the same geometry.

9. The article of claim 1, wherein at least 90% of the plurality of undercut features extend from the integral backing a distance that is within 20% of the average distance of all of the undercut features.

10. The article of claim 1, wherein each of the plurality of undercut features extends from the integral backing a distance between 0.001 inch (in) (0.0254 millimeters (mm)) and 0.25 in (6.35 mm).

11. The article of claim 1, wherein the polyolefin comprises polypropylene or polyethylene.

12. The article of claim 1, wherein the adhesive comprises an epoxy, a polyurea, an acrylic, a cyanoacrylate, a polyamide, a phenolic, a polyimide, or a polyurethane.

13. A method of forming an article comprising a multilayer structure, comprising:
   (a) depositing a polyolefin resin into a mold cavity to form a first layer comprising a plurality of undercut features on and extending from an integral backing;
   (b) demolding the first layer from the mold cavity at a rate of at least 150 millimeters per minute (mm/min);
   (c) applying a curable adhesive to the plurality of undercut features to form a second layer attached to the first layer, the curable adhesive having a Shore D hardness of greater than 59 when cured; and (d) attaching a third layer comprising a substrate to the second layer, wherein the second layer is disposed between the first layer and the third layer, wherein the article exhibits a peak load of at least 150 N as determined by a 180° peel test.

14. The method of claim 13, further comprising heating the resin to a temperature above the melting temperature ($T_m$) of the polyolefin resin prior to depositing the polyolefin resin into the mold cavity.

15. The method of claim 13, further comprising cooling the polyolefin resin in the mold cavity by maintaining the temperature of the mold cavity at between 25° C. and below the $T_m$ of the polyolefin resin, prior to demolding the first layer from the mold cavity.

16. The method of claim 13, wherein the second layer is attached to the first layer via interlocking of the adhesive with the plurality of undercut features.

17. The method of claim 13, wherein when the demolding is performed the temperature of the mold cavity is maintained at a temperature between the $T_m$ of the polyolefin resin and 30° C. below the $T_m$ of the polyolefin resin.

18. The method of claim 13, wherein the polyolefin comprises a melt index between 0.1 and 10 grams per 10 minutes (g/10 min).

19. The method of claim 13, comprising demolding the first layer from the mold cavity at a rate of at least 250 mm/min.

* * * * *